(12) United States Patent  (10) Patent No.: US 8,472,143 B2
Fujimoto  (45) Date of Patent: *Jun. 25, 2013

(54) MAGNETIC HEAD SUSPENSION HAVING A LOAD BEAM PART WITH AN INFLECTION POINT

(75) Inventor: Yasuo Fujimoto, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,754

(22) Filed: Jun. 6, 2011

(65) Prior Publication Data

US 2012/0087043 A1   Apr. 12, 2012

(30) Foreign Application Priority Data

Jun. 7, 2010 (JP) ................................. 2010-129991

(51) Int. Cl.
*G11B 5/48* (2006.01)
(52) U.S. Cl.
USPC ..................................... 360/244.2; 360/244.9
(58) Field of Classification Search
USPC .................. 360/244.2, 244.3, 244.9
See application file for complete search history.

(56) References Cited

U.S. PATENT DOCUMENTS

| | | | | |
|---|---|---|---|---|
| 4,797,763 A * | 1/1989 | Levy et al. | ................. | 360/245.6 |
| 5,731,931 A * | 3/1998 | Goss | ......................... | 360/244.9 |
| 6,392,843 B1 * | 5/2002 | Murphy | ..................... | 360/245.3 |
| 6,731,465 B2 * | 5/2004 | Crane et al. | ................ | 360/244.3 |
| 7,133,259 B2 * | 11/2006 | Takagi et al. | ............... | 360/244.3 |
| 7,333,299 B2 * | 2/2008 | Wada et al. | ................ | 360/294.7 |
| 7,375,927 B1 * | 5/2008 | Miller | ........................ | 360/244.3 |
| 8,159,785 B1 * | 4/2012 | Lee et al. | ................... | 360/244.2 |
| 2006/0227463 A1 * | 10/2006 | Wright et al. | .............. | 360/244.2 |
| 2010/0202087 A1 * | 8/2010 | Fujimoto et al. | ............ | 360/244.2 |
| 2010/0208389 A1 * | 8/2010 | Ikeji | ........................... | 360/244.2 |
| 2010/0277834 A1 * | 11/2010 | Nojima | ..................... | 360/244.2 |
| 2012/0087043 A1 * | 4/2012 | Fujimoto | ................... | 360/244.2 |

FOREIGN PATENT DOCUMENTS

| | | |
|---|---|---|
| JP | 63-213179 | 9/1988 |
| JP | 01-245477 | 9/1989 |
| JP | 04-285776 | 10/1992 |
| JP | 09-091909 | 4/1997 |
| JP | 2005-032393 A | 2/2005 |
| JP | 2008-021374 A | 1/2008 |

OTHER PUBLICATIONS

The Notification of Reason(s) for Rection for related Japanese Appl. No. 2010-129991, Japanese Patent Office, mailed Apr. 27, 2012, 4 pgs.

* cited by examiner

*Primary Examiner* — Brian Miller
(74) *Attorney, Agent, or Firm* — Sterne, Kessler, Goldstein & Fox P.L.L.C.

(57) ABSTRACT

Each of side edges of a main body portion of a load beam part includes a proximal end region inclined at a first inclination angle so as to come closer to a suspension longitudinal center line as it goes from proximal to distal sides, and a distal end region inclined at a second inclination angle smaller than the first inclination angle so as to come closer to the center line as it goes from a proximal side connected via an inflection point to a distal end of the proximal end region to a distal side.

8 Claims, 16 Drawing Sheets

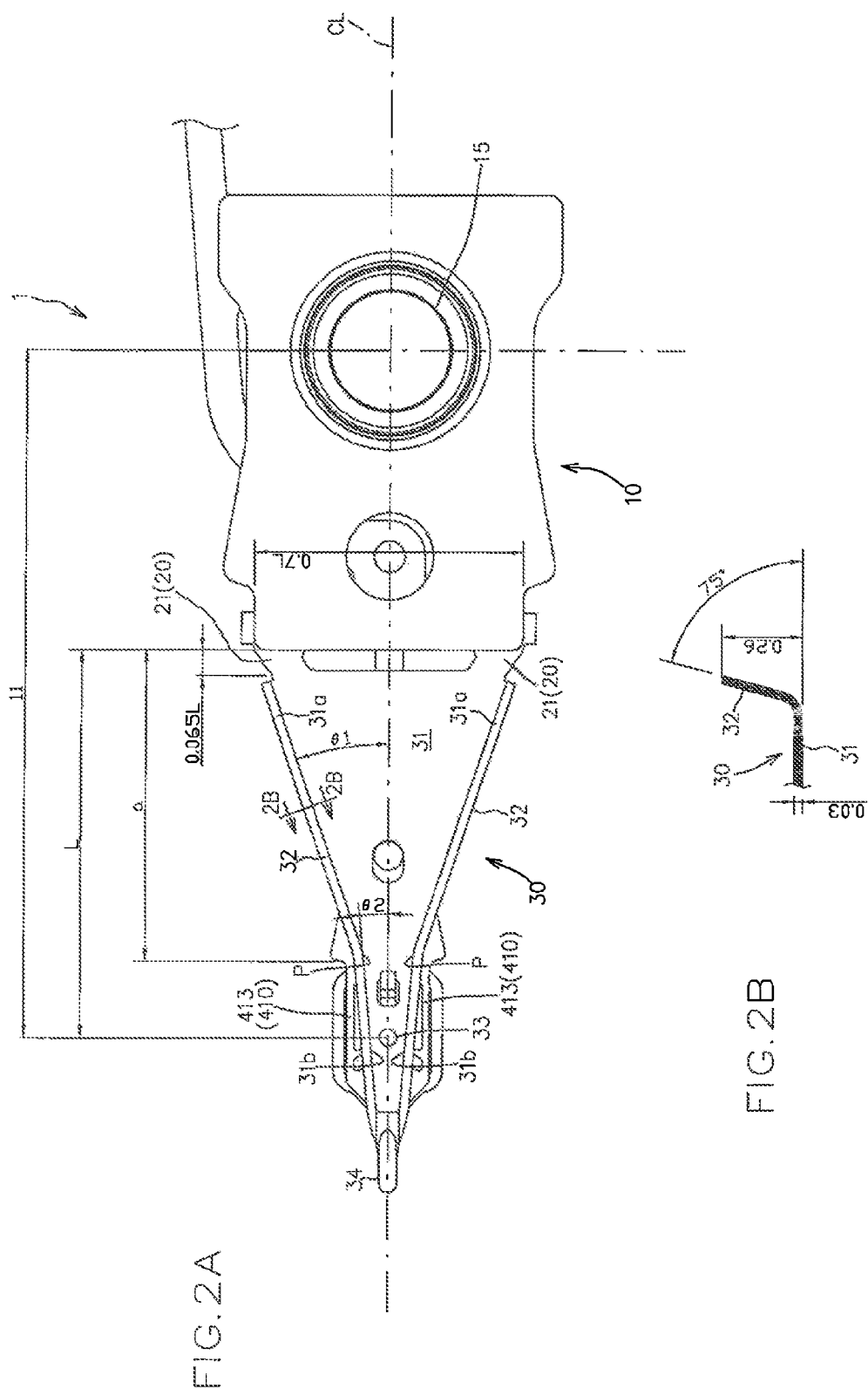

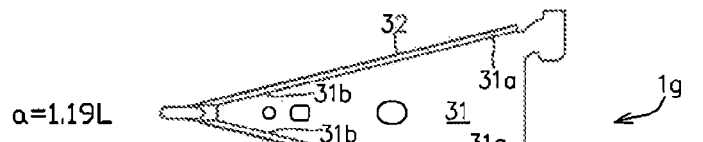
FIG. 3G   a=1.19L
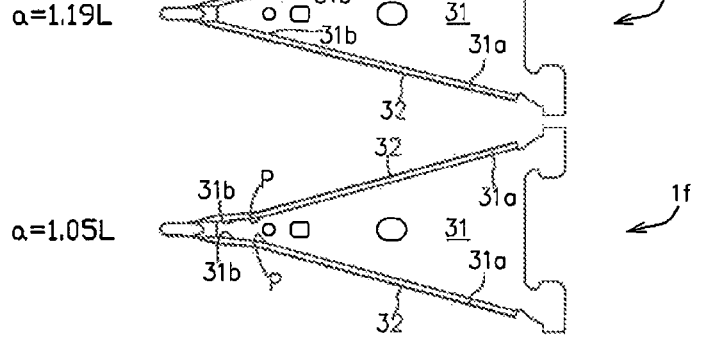
FIG. 3F   a=1.05L
FIG. 3E   a=0.91L
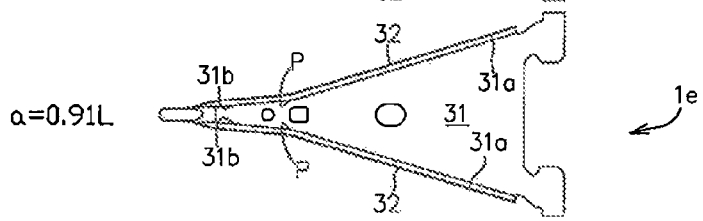
FIG. 3D   a=0.78L
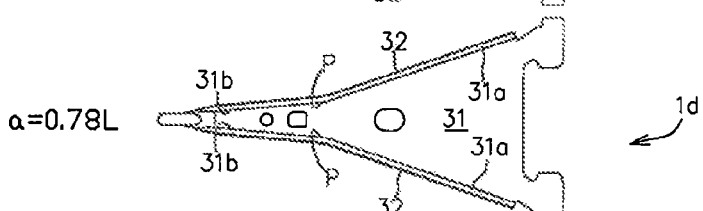
FIG. 3C   a=0.65L
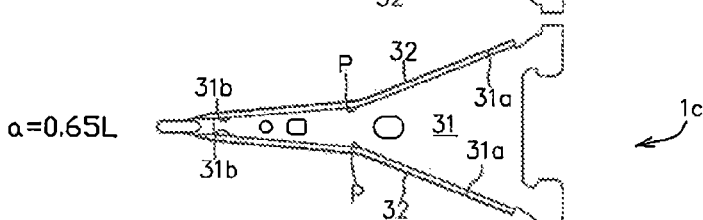
FIG. 3B   a=0.52L
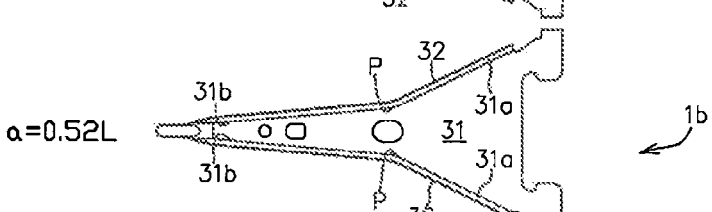
FIG. 3A   a=0.39L
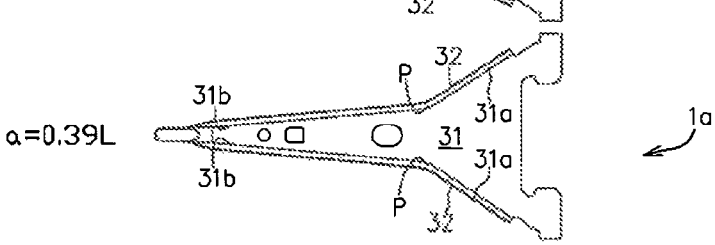

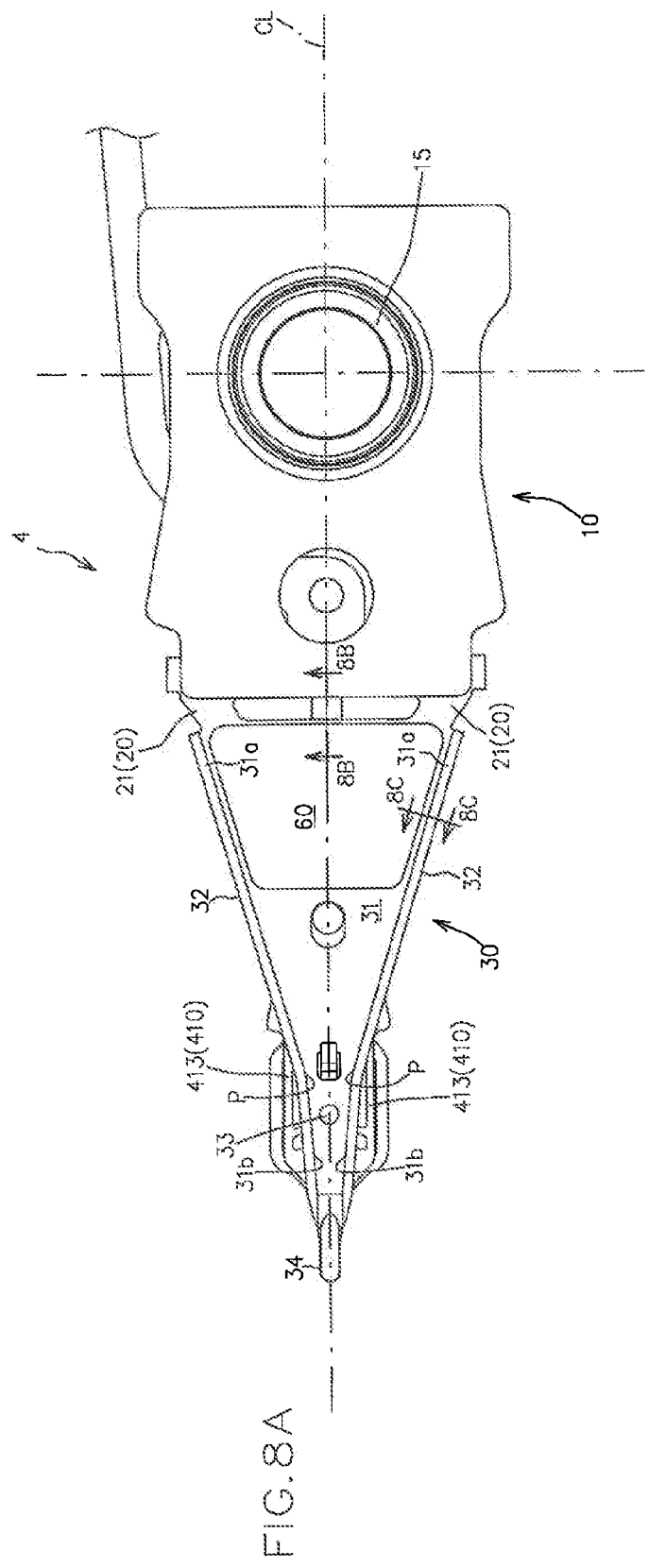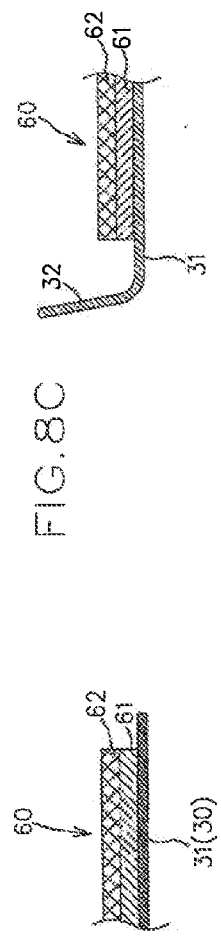

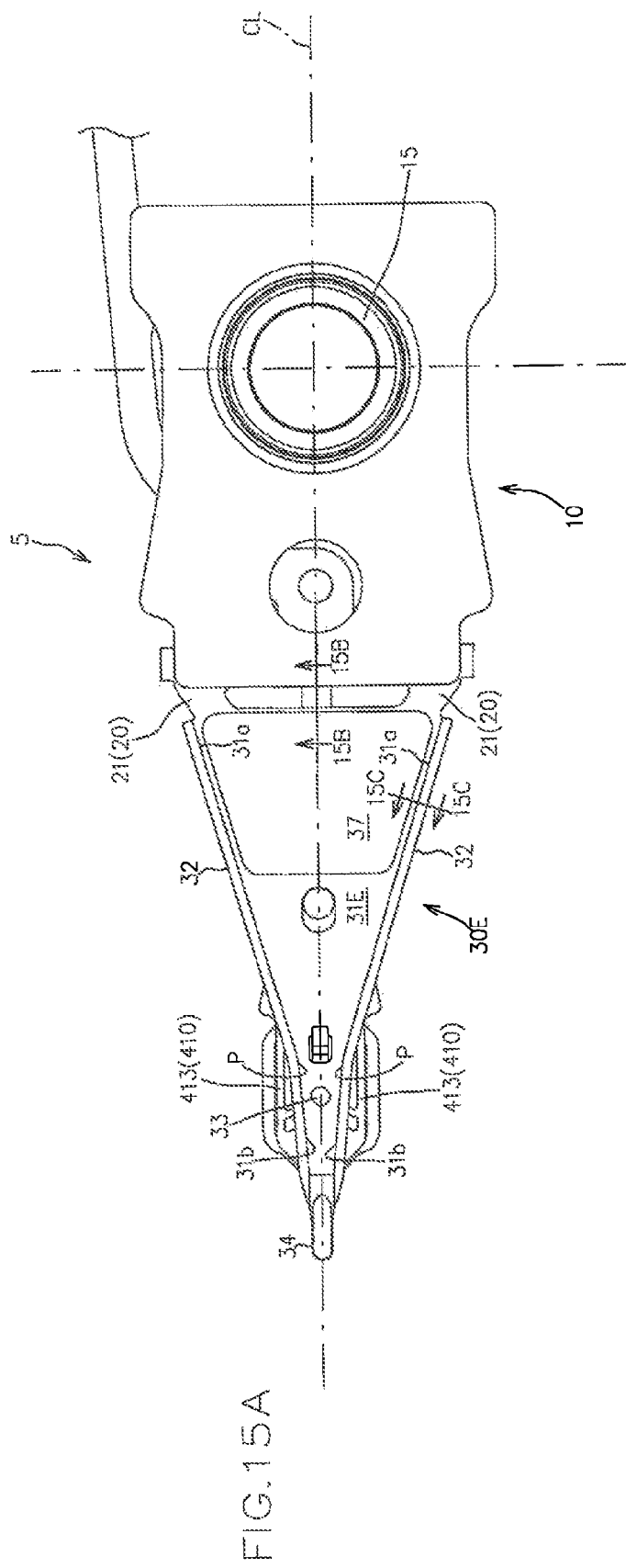
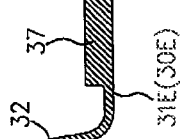
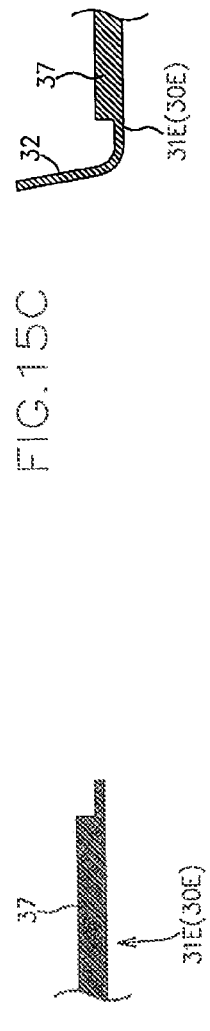
FIG.15A
FIG.15B
FIG.15C

MAGNETIC HEAD SUSPENSION HAVING A LOAD BEAM PART WITH AN INFLECTION POINT

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Due to an increase in capacity of a magnetic disk device, a magnetic head suspension is required to enhance a positioning accuracy of a magnetic head slide to a target track. In order to enhance the positioning accuracy, it is required to prevent, as much as possible, vibration of the magnetic head slider when the magnetic head suspension is swung in a seek direction parallel to a disk surface by an actuator such as a voice coil motor.

For example, Japanese Unexamined Patent Publication No. 2005-032393 (hereinafter, referred to as Prior Art Document 1) discloses a magnetic head suspension including a load beam part that has a main body portion in a flat plate shape and paired right and left ribs (flange portions) extending respectively from side edges of the main body portion in a direction opposite from the disk surface. In this magnetic head suspension, the respective side edges of the main body portion are inclined toward a suspension longitudinal center line such that the load beam part is gradually reduced in width as it goes from a proximal end to a distal end in the suspension longitudinal direction. Further, each of the ribs is at least partially curved to form a narrowed portion in a planar view as viewed along a direction perpendicular to the disk surface.

The magnetic head suspension disclosed in Prior Art Document 1 is regarded such that the provision of the narrowed portions reduces the weight of the load beam part, thereby allowing the resonant frequency of the load beam part to be higher than the conventional configurations.

As described above, Prior Art Document 1 discloses the feature that the resonant frequency can be raised by the narrowed portions provided to the flange portions of the load beam part. However, it is unknown in Prior Art Document 1 which one of various vibration modes is focused on with regard to the resonant frequency possibly generated to a magnetic head suspension.

Japanese Unexamined Patent Publication No. 2008-021374 (hereinafter, referred to as Prior Art Document 2) discloses a magnetic head suspension including first and second members. The first member includes an elastic deformation portion and a main body portion that extends forward from the elastic deformation portion. The main body portion is gradually reduced in width as it advances forward and is provided with flanges at right and left side edges thereof. The second member is substantially in a T-letter shape that includes a wide portion provided at a proximal edge with a flange and a narrow portion extending forward from the wide portion. The narrow portion has a width smaller than that of the main body portion, and is provided at right and left side edges with flanges.

In Prior Art Document 2, the first and second members are joined with each other to form an assembly, which integrally configures a load bending part and a load beam part.

That is, the elastic deformation portion configures the load bending part, and the main body portion and the second member configure the load beam part.

More specifically, the side edges of the main body portion are provided with the flanges and are inclined so as to be gradually come closer to the suspension longitudinal center line as they advance to the respective front ends. The side edges of the narrow portion are provided with the flanges and extend substantially in parallel with the suspension longitudinal center line at positions closer to the center line than the side edges of the main body portion.

Accordingly, the load beam part configured by the main body portion and the second member has the right and left side edges that are provided with the flanges substantially in the entire areas in the suspension longitudinal direction. The side edges have proximal end regions that are respectively inclined at a first inclination angle with respect to the center line so as to gradually come closer to the center line as they advance to the respective front ends, and distal end regions that extend substantially in parallel with the center line.

In the magnetic head suspension disclosed in Prior Art Document 2, the distal end region of the load beam part is configured by the narrow portion, thereby successfully reducing the width of the load beam part as compared to the conventional cases. This will lead to the reduction of the moment of inertia of the load beam part about a twist center line along the center line so as to raise the resonant frequency in a first torsion mode.

Out of the various vibration modes possibly generated in the magnetic head suspension, the first and second torsion modes have the resonance frequencies within the low frequency range.

Accordingly, in order to enhance the positioning accuracy of the magnetic head slider, it is required to prevent the displacement of the magnetic head slider due to the resonant vibrations in the first and second torsion modes.

The magnetic head suspension disclosed by Prior Art Document 2 is regarded such that the resonant vibration in the first torsion mode can be prevented by the increased resonant frequency in the first torsion mode. However, in the magnetic head suspension, the second torsion mode is not taken into consideration.

The amount (gain) of displacement of the magnetic head slider due to the resonant vibration in the first torsion mode can be easily reduced by adjusting a bended position of the load bending part. However, it is extremely difficult to reduce the amount (gain) of displacement of the magnetic head slider due to the resonant vibration in the second torsion mode by adjusting the bended position of the load bending part.

More specifically, in the resonant vibration in the first torsion mode, in a state where a position at which the load bending part is arranged and a position at which a dimple of the load beam part is arranged are fixed so as not to be displaced in a z direction perpendicular to the disk surface (namely, the positions form nodes), only the load beam part is principally twisted about a twist center line along the suspension longitudinal center line so that a substantially center portion between the two nodes in the suspension longitudinal direction is displaced to the maximum in the z direction (namely, the substantially center portion forms an antinode).

On the other hand, in the resonant vibration in the second torsion mode, in a state where three positions form the nodes, the three positions including a position at which a supporting part is rigidly fixed with respect to the z direction (in a case where the supporting part is configured by a base plate, a position of a boss portion that is fixed by caulking (or swaging) to a carriage arm coupled to an actuator; hereinafter, referred to as a supporting part fixed position), a position at which the dimple is arranged, and a halfway position of the load beam part that is located at a substantially center in the suspension longitudinal direction between the supporting part fixed position and the position of the dimple, a distal end region of the supporting part, the load bending part and the load beam part are twisted about the twist center line along the suspension longitudinal center line so that two portions form the antinode, the two portions including a substantially center portion between the supporting part fixed position and the halfway position of the load beam part in the suspension longitudinal direction and a substantially center portion between the halfway position of the load beam part and the position of the dimple in the suspension longitudinal direction.

As explained above, in the resonant vibration in the second torsion mode, the node is generated in the halfway position of the load beam part in the suspension longitudinal direction. The load beam part includes the main body portion substantially parallel to the disk surface, and the paired right and left flange portions extending respectively from the right and left side edges of the main body portion in the direction opposite from the disk surface. That is, in the resonant vibration in the second torsion mode, the node is generated in an area having a high rigidity with respect to the twist motion about the twist center line along the longitudinal center line.

For this reason, the resonant frequencies in the second torsion mode are likely to be varied among the individual suspensions. Accordingly, reduction of the gain of the magnetic head slider in the resonant vibration in the second torsion mode by adjusting the bended position of the load bending part is much more difficult than reduction of the gain of the magnetic head slider in the resonant vibration in the first torsion mode.

SUMMARY OF THE INVENTION

The present invention has been made in view of the above conventional art, and it is an object thereof to provide a magnetic head suspension capable of preventing as much as possible a generation of resonant vibration in the second torsion mode in which reduction of a gain of the magnetic head slider by adjusting a bended position of a load bending part is difficult.

In order to achieve the object, the present invention provides a magnetic head suspension including a supporting part that is swung in a seek direction parallel to a disk surface directly or indirectly by an actuator, a load bending part that is connected at a proximal end portion to a distal end portion of the supporting part so as to generate a load for pressing a magnetic head slider toward the disk surface, a load beam part that is connected at a proximal end portion to a distal end portion of the load bending part and transmits the load to the magnetic head slider, and a flexure part that is supported by the load beam part and the supporting part, wherein the load beam part includes a plate-like main body portion and paired right and left flange portions, the main body portion having a proximal end portion that is connected to the load bending part and a lower surface that faces the disk surface and to which a flexure substrate of the flexure part is fixed, the paired flange portions extending from both side edges of the main body portion in a suspension width direction toward a direction opposite from the disk surface, wherein each of the right and left side edges of the main body portion includes a proximal end region and a distal end region, the proximal end region being inclined to a suspension longitudinal center line at a first inclination angle so as to be come closer to the center line as it advances from the proximal side to the distal side in the suspension longitudinal direction, the distal end region being inclined to the center line at a second inclination angle, which is smaller than the first inclination angle, so as to be come closer to the center line as it advances from the proximal side, which is connected to the distal portion of the proximal end region with an inflection point being interposed between them, to the distal side in the suspension longitudinal direction, and wherein, in a case where a distance in the suspension longitudinal direction between the distal end portion of the supporting part and a dimple provided in the load beam part is represented by "L", a distance "a" in the suspension longitudinal direction between the distal end portion of the supporting part and the inflection point is set so as to satisfy a condition of $0.78\,L \leq a \leq 1.13\,L$.

The configuration makes it possible to raise the resonant frequency in the second torsion mode, thereby effectively preventing the resonant vibration in the second torsion mode from being generated.

More specifically, it is possible to easily reduce the amount (gain) of the displacement of the magnetic head slider due to the resonant vibration in the first torsion mode by adjusting a bended position of the load bending part. Therefore, the magnetic head suspension according to the present invention can prevent as much as possible the displacement of the magnetic head slider from a targeted track due to the vibration in the first torsion mode as well as the vibration in the second torsion mode.

In a preferable configuration, the load beam part may be provided at the proximal edge of the main body portion with a proximal flange portion that extends toward the direction opposite from the disk surface.

In a preferable configuration, the main body portion of the load beam part is provided with a convex portion that bulges toward the direction opposite from the disk surface.

For example, the convex portion is provided so as to extend in the suspension width direction.

Any one of the magnetic head suspensions explained earlier preferably further includes a damper fixed to the upper surface, which is opposite from the disk surface, of the main body portion of the load beam part.

In a preferable configuration, the main body portion of the load beam part may include a thick region that is thickened toward the direction opposite from the disk surface.

In a preferable configuration, the damper or the thick region is arranged so that a proximal end portion thereof is located at a position substantially identical with a position of the proximal edge of the main body portion, and a distance "b" in the suspension longitudinal direction between a distal end portion thereof and the distal end portion of the supporting part satisfies a condition of $0.4\,L \leq b \leq 0.7\,L$.

BRIEF DESCRIPTION OF THE DRAWINGS

FIG. 2A is a top view of a magnetic head suspension used for first and second analyses.

FIG. 2B is a cross sectional view taken along line 2B-2B in FIG. 2A.

FIGS. 3A to 3G are top views of load beam parts of the magnetic head suspensions used for the first and second analyses.

FIG. 8A is a top view of a magnetic head suspension according to a fourth embodiment of the present invention.

FIGS. 8B and 8C are cross sectional views taken along line 8B-8B and line 8C-8C in FIG. 8A, respectively.

FIG. 15A is a top view of a magnetic head suspension according to a fifth embodiment of the present invention.

FIGS. 15B and 15C are cross sectional views taken along line 15B-15B and line 15C-15C in FIG. 15A, respectively.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1A:
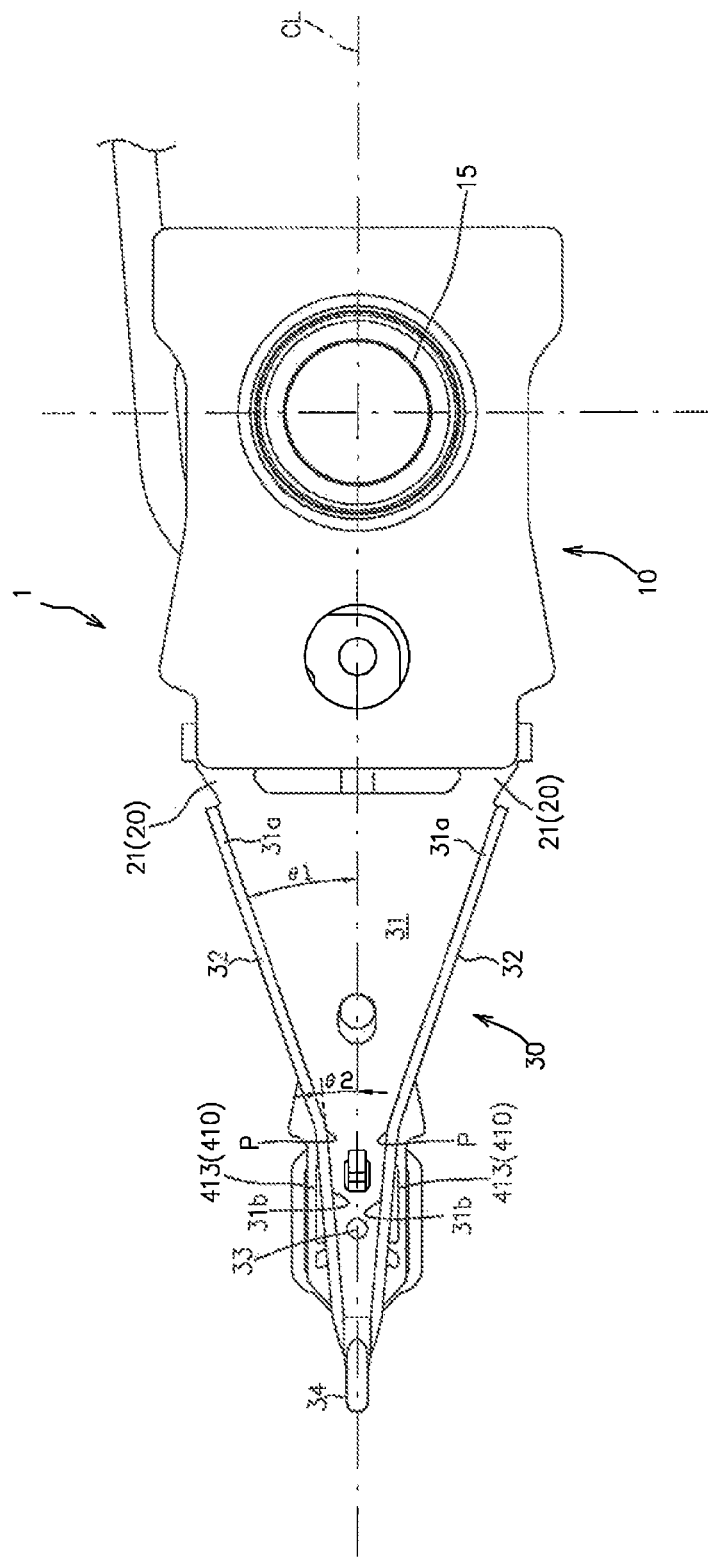
FIG. 1A is a top view of a magnetic head suspension according to a first embodiment of the present invention.
Figure 1B:
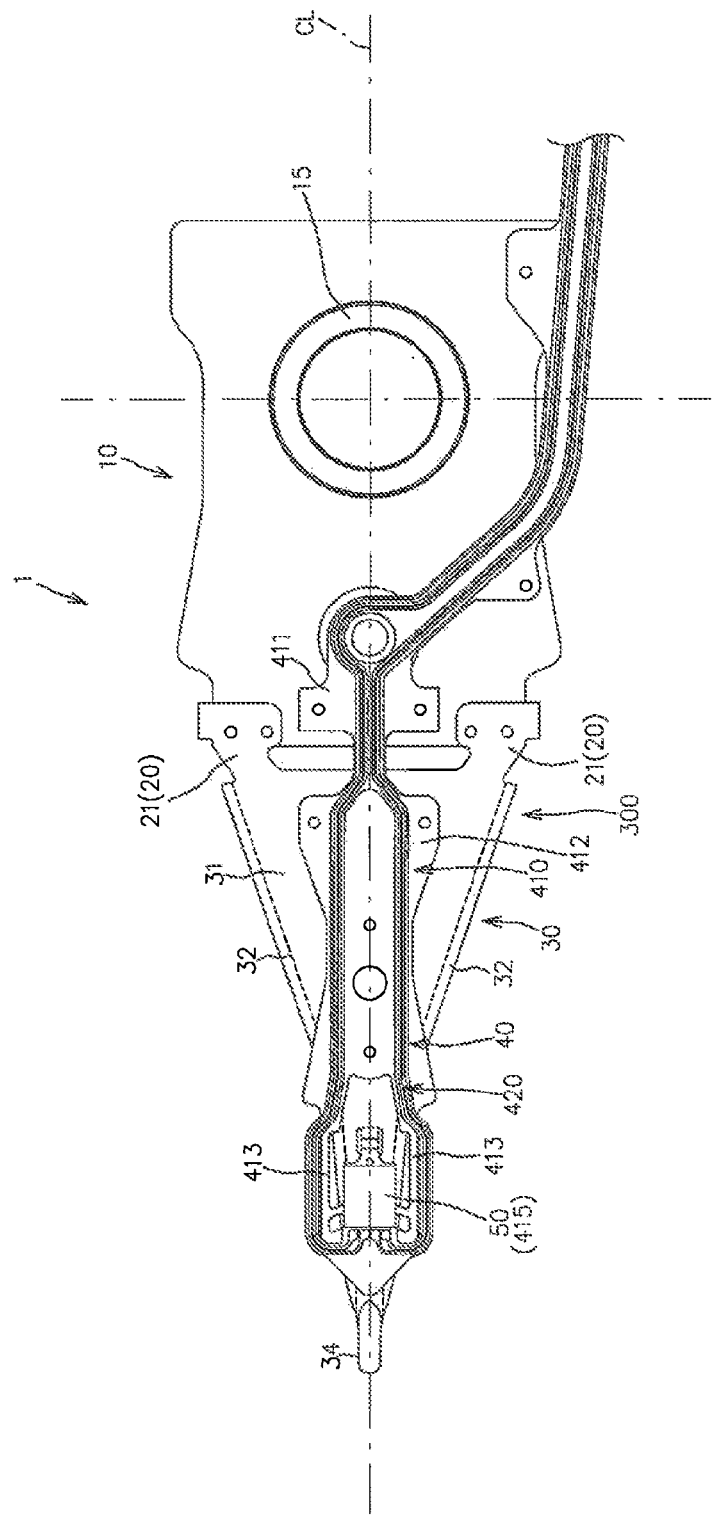
FIG. 1B is a bottom view of the magnetic head suspension according to the first embodiment.

FIGS. 1A and 1B are a top view (a plan view as viewed from a side opposite from a disk surface) and a bottom view (a bottom plan view as viewed from a side facing the disk surface) of a magnetic head suspension 1 according to the present embodiment, respectively. FIG. 1B indicates welding points with using small circles.

As shown in FIGS. 1A and 1B, the magnetic head suspension 1 includes a supporting part 10 that is swung in a seek direction parallel to the disk surface directly or indirectly by an actuator (no shown) such as a voice coil motor, a load bending part 20 that is connected at a proximal end portion to a distal end portion of the supporting part 10 so as to generate a load for pressing a magnetic head slider 50 toward the disk surface, a load beam part 30 that is connected at a proximal end portion to a distal end portion of the load bending part 20 and transmits the load to the magnetic head slider 50, and a flexure part 40 that is supported by the load beam part 30 and the supporting part 10.

The supporting part 10 is a member for supporting the load beam part 30 through the load bending part 20 while being directly or indirectly connected to the actuator, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

It is of course possible to adopt as the supporting part 10 an arm having a proximal end that is connected to the swing center of the main actuator.

As described above, the load beam part 30 is a member for transmitting the load generated by the load bending part 20 to the magnetic head slider 50, and therefore is required to have a predetermined rigidity.

As shown in FIGS. 1A and 1B, in the present embodiment, the load beam part 30 has a plate-like main body portion 31, and paired right and left flange portions 32 that extend from both side edges of the main body portion 31 in a suspension width direction toward a direction opposite from the disk surface, and secures the rigidity by the flange portions 32.

The load beam part 30 may be preferably made from, for example, a stainless plate having a thickness of 0.02 mm to 0.1 mm.

As shown in FIG. 1A, each of the right and left side edges of the main body portion 31 includes a proximal end region 31a that is located on a proximal side in a suspension longitudinal direction, and a distal end region 31b that extends from the proximal end region 31a to a distal side in the suspension longitudinal direction.

The proximal end region 31a is inclined to a suspension longitudinal center line CL at a first inclination angle θ1 so as to come closer to the center line CL as it goes from the proximal side to the distal side in the suspension longitudinal direction.

The distal end region 31b is inclined to the center line CL at a second inclination angle θ2, which is smaller than the first inclination angle θ1, so as to come closer to the center line CL as it goes from the proximal side to the distal side in the suspension longitudinal direction.

More specifically, although both the proximal end region 31a and the distal end region 31b are inclined so as to come closer to the center line CL as they go toward the distal end in the suspension longitudinal direction, the second inclination angle θ2 of the distal end region 31b is smaller than the first inclination angle θ1 of the proximal end region 31a so that there is a inflection point P between the corresponding proximal end region 31a and the distal end region 31b.

In a case where the inclination angles of the proximal end region 31a and the distal end region 31b are differed from each other so that the inflection point P is generated, the flange portion 32 is likely to be strained in the vicinity of the inflection point. In this regard, the inflection point P of the flange portion may be preferably formed so as to have a curved shape that is opened outward in the suspension width direction in a plan view, which results in reduction of strain of the flange portion 32.

The main body portion 31 is formed, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 415 of the flexure part 40, so that the load is transmitted to the head-mounting region 415 of the flexure part 40 through the protrusion 33.

In the present embodiment, the load beam part 30 further integrally includes a lift tab 34 that extends from a distal end of the main body portion 31 toward the distal side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1 is swung by the main actuator so that the magnetic head slider 50 is positioned outward from the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A and 1B, in the present embodiment, the load bending part 20 includes paired right and left leaf springs 21 that have plate surfaces facing the disk surface and are disposed away from each other with the center line CL being sandwiched between them.

Preferably, the paired leaf springs 21 are elastically bended at a predetermined bended position in such a direction as to cause the magnetic head suspension 50 to become close to the disk surface before the magnetic head suspension 1 is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1A and 1B, the load bending part 20 is integrally formed with the load beam part 30.

More specifically, the magnetic head suspension 1 according to the present embodiment includes a load beam part/load bending part component that integrally forms the load beam part 30 and the load bending part 20. The load beam part/load bending part component is connected by welding to the supporting part 10 in a state where an upper surface of the load beam part/load bending part component that is opposite from the disk surface is brought into contact with, a lower surface of the supporting part 10 that faces the disk surface.

Of course, it is possible that the load beam part and the load bending part are made separately from each other, and then they are connected to each other by welding or the like.

The flexure part 40 is fixed by welding or the like to the load beam part 30 and the supporting part 10 while supporting the magnetic head slider 50.

More specifically, the flexure part 40 includes a flexure metal plate 410.

As shown in FIG. 1B, the flexure metal plate 410 includes a supporting part fixed region 411 fixed by a welding or the like to the supporting part 10, a load beam part fixed region 412 fixed by a welding or the like to the load beam part 30, paired supporting pieces 413 extending toward the distal side in the suspension longitudinal direction from both sides, in the suspension width direction, of the distal portion of the load beam part fixed region 412, and the head-mounting region 415 supported by the supporting pieces 413.

The head-mounting region 415 supports the magnetic head slider 50 at its lower surface that faces the disk surface, as shown in FIG. 1B.

As explained earlier, the protrusion 33 is brought into contact with the upper surface of the head-mounting region 415, so that the head-mounting region 415 could sway flexibly in a roll direction and in a pitch direction, with the protrusion 33 functioning as a fulcrum.

The flexure metal plate 410 has rigidity lower than that of the load beam part 30, so that the head-mounting region 415 could sway in the roll direction and in the pitch direction.

The flexure metal plate 410 may be made from, for example, a stainless plate having a thickness of 0.01 mm to 0.025 mm.

In the present embodiment, as shown in FIG. 1B, the flexure part 40 further integrally includes a wiring structure 420 for electrically connecting the magnetic head slider 50 to an outside member.

More specifically, the wiring structure 420 includes an insulating layer laminated on the lower surface of the flexure metal plate 410 that faces the disk surface, and a signal wiring laminated on a surface of the insulating layer that faces the disk surface.

Preferably, the signal wiring may include an insulative cover layer (not shown) enclosing the signal wiring.

Described below are a first analysis on the relationship between the position of the inflection point P in the suspension longitudinal direction and the resonant frequency of the magnetic head suspension 1 in the first torsion mode, and a second analysis on the relationship between the position of the inflection point P and the resonant frequency of the magnetic head suspension 1 in the second torsion mode.

FIG. 2A is a top view of the magnetic head suspension 1 used for the first and second analyses.

FIG. 2B is a cross sectional view taken along line 2B-2B in FIG. 2A.

In each of these analyses, the supporting part 10, the load beam part 30 and the flexure metal plate 410 were formed by stainless plates having thicknesses of 0.17 mm, 0.03 mm and 0.02 mm, respectively.

A length in the suspension longitudinal direction was set to 11 mm between the position of the dimple 33 and the position of the supporting part 10 that is fixed with respect to z direction perpendicular to the disk surface (in a case where the supporting pat 10 is configured by a base plate as in the present embodiment, the position of the boss portion 15 that is fixed by caulking (or swaging) to the carriage arm coupled to the actuator; hereinafter, referred to as a supporting part fixed position). A length "L" in the suspension longitudinal direction was set to 6.2 mm between the distal edge of the supporting part 10 and the dimple 33. A length of the load bending part 20 in the suspension longitudinal direction (that is, the length in the suspension longitudinal direction between the distal edge of the supporting part 10 and the proximal end of the load beam part 30) was set to 0.065 L (=0.40 mm). Further, a length at the distal edge of the supporting part 10 in the suspension width direction was set to 0.7 L (=4.3 mm).

Further, the flange portions 32 of the load beam part 30 were configured so that respective inclination angles to the main body portion 31 were 75° and respective heights in z direction were 0.26 mm.

The first inclination angle $\theta 1$ (the inclination angle of the proximal end region 31a to the suspension longitudinal center line CL) was set to 19°, and the second inclination angle $\theta 2$ (the inclination angle of the distal end region 31b to the suspension longitudinal center line CL) was set to 5° that is smaller than the first inclination angle $\theta 01$.

The resonant frequencies in the first and second torsion modes were obtained on each of a plurality of magnetic head suspensions in accordance with the finite element method, the plurality of magnetic head suspensions being common to each other with respect to the above-explained configuration, but are different from each other with respect to the positions of the inflection points P in the suspension longitudinal direction.

More specifically, the resonant frequencies in the first and second torsion modes were obtained in accordance with the finite element method on magnetic head suspensions 1a to 1g in which distances "a", each in the suspension longitudinal direction between the distal edge of the supporting part 10 and each of the inflection points P, were set to 0.39 L (=2.45 mm), 0.52 L (=3.25 mm), 0.65 L (=4.05 mm), 0.78 L (=4.85 mm), 0.91 L (=5.65 mm), 1.05 L (=6.49 mm) and 1.19 L (=7.39 mm), respectively.

FIGS. 3A to 3G are top views of the respective load beam parts 60 of the magnetic head suspensions 1a to 1g.

In the magnetic head suspension 1g, the first inclination angle θ1 of the proximal end regions 31a and the second inclination angle θ2 of the distal end regions 31b are identical with each other. In other words, in the magnetic head suspension 1g, the right and left side edges of the main body portion 31 each have a linear shape in the entire area in the suspension longitudinal direction.

Figure 4:
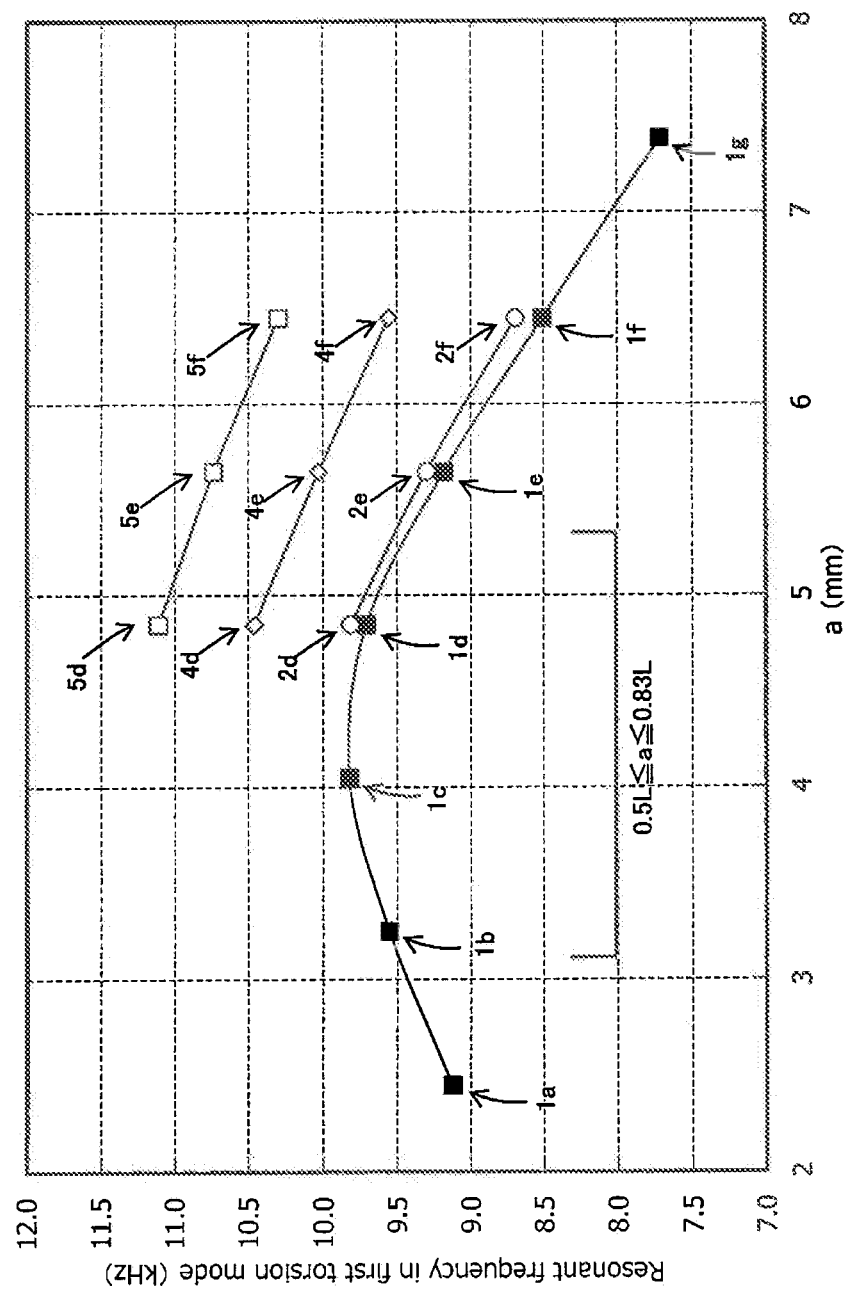
FIG. 4 is a graph showing a result of the first analysis.

FIG. 4 shows a result of the first analysis on the relationship between the distance "a" and the resonant frequency in the first torsion mode.

Figure 5:
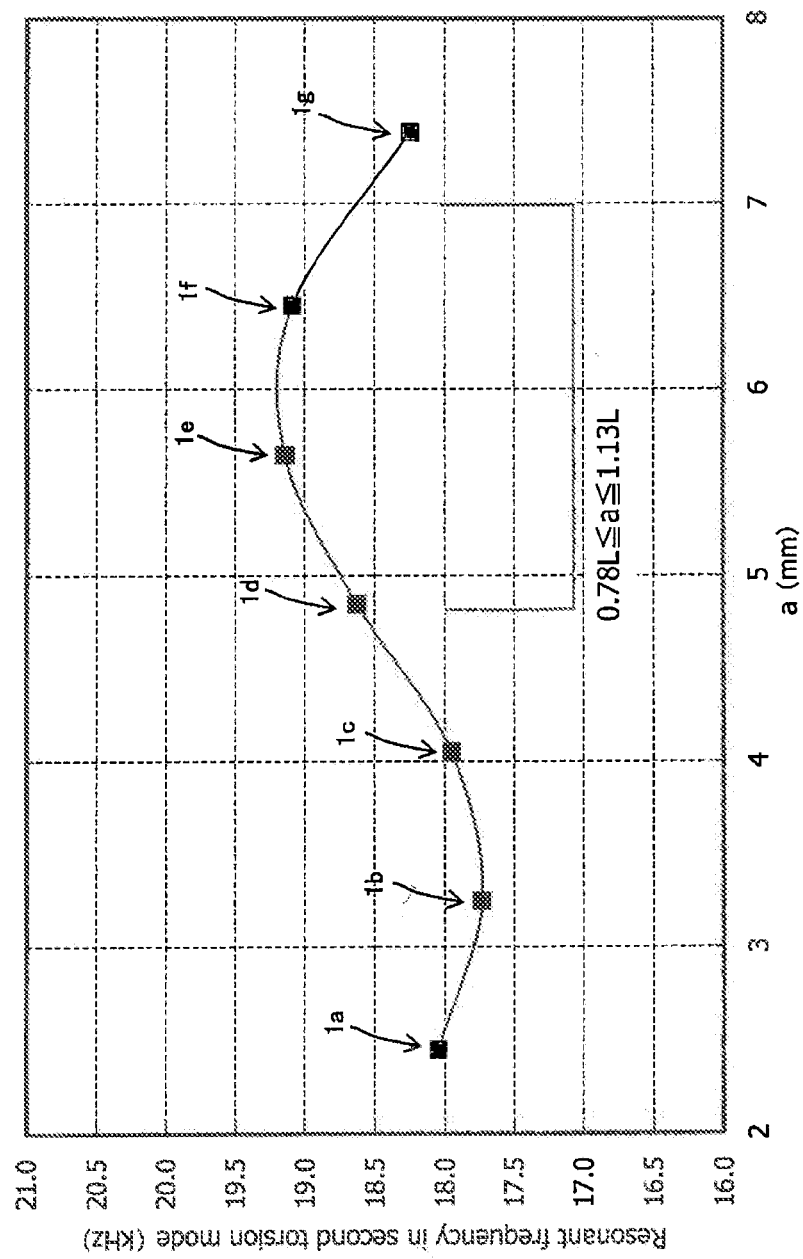
FIG. 5 is a graph showing a result of the second analysis.

FIG. 5 shows a result of the second analysis on the relationship between the distance "a" and the resonant frequency in the second torsion mode.

As can be recognized from FIG. 4, the resonant frequency in the first torsion mode can be raised by setting the distance "a" so as to be more than or equal to 0.5 L (=3.1 mm) and less than or equal to 0.83 L (=5.2 mm).

As can be recognized from FIG. 5, the resonant frequency in the second torsion mode can be raised by setting the distance "a" so as to be more than or equal to 0.78 L (=4.85 mm) and less than or equal to 1.13 L (=7 mm).

By the way, the amount (the gain) of the displacement of the magnetic head slider 50 due to the resonant vibration in the first torsion mode can be easily reduced by adjusting the bended position of the load bending part 20. However, it is extremely difficult to reduce the amount (gain) of displacement of the magnetic head slider 50 due to the resonant vibration in the second by adjusting the bended position of the load bending part 20.

More specifically, in the resonant vibration in the first torsion mode, in a state where the position at which the load bending part 20 is arranged and the position at which the dimple 33 of the load beam part 30 is arranged are fixed so as not to be displaced in the z direction perpendicular to the disk surface (namely, the positions form nodes), only the load beam part 20 is principally twisted about a twist center line along the suspension longitudinal center line CL so that a substantially center portion between the two nodes in the suspension longitudinal direction is displaced to the maximum in the z direction (namely, the substantially center portion forms an antinode).

On the other hand, in the resonant vibration in the second torsion mode, in a state where three positions form the nodes, the three positions including the supporting part fixed position of the supporting part 10 that is rigidly fixed with respect to the z direction, the position of the dimple 33, and a halfway position of the load beam part 30 that is located at a substantially center in the suspension longitudinal direction between the supporting part fixed position and the position of the dimple 33, a region of the supporting part 10 that is positioned on a distal side from the supporting part fixed position in the suspension longitudinal direction, the load bending part 20 and the load beam part 30 are twisted about the twist center line along the suspension longitudinal center line CL so that two portions form the antinode, the two portions including a substantially center portion between the supporting part fixed position and the halfway position of the load beam part 30 in the suspension longitudinal direction and a substantially center portion between the halfway position of the load beam part 30 and the position of the dimple 33 in the suspension longitudinal direction.

As explained above, in the resonant vibration in the second torsion mode, the node is generated in the halfway position of the load beam part 30 in the suspension longitudinal direction. The load beam part 30 includes the paired right and left flange portions 32 extending respectively from the right and left side edges of the main body portion 31 in the direction opposite from the disk surface. That is, in the resonant vibration in the second torsion mode, the node is generated in an area having a high rigidity with respect to the twist motion about the twist center line along the longitudinal center line CL.

For this reason, the resonant frequencies in the second torsion mode are likely to be varied among the individual suspensions. Accordingly, reduction of the gain of the magnetic head slider 50 in the resonant vibration in the second torsion mode by adjusting the bended position of the load bending part 20 is much more difficult than reduction of the gain of the magnetic head slider 50 in the resonant vibration in the first torsion mode.

With respect to this point, as being apparently seen from FIG. 5, setting the distance "a" within the range that is more than or equal to 0.78 L (=4.85 mm) and less than or equal to 1.13 L (=7 mm) makes it possible to increase the resonant frequency of the magnetic head suspension 1 in the second torsion mode.

That is, setting the distance "a" within the range that is more than or equal to 0.78 L (=4.85 mm) and less than or equal to 1.13 L (=7 mm) can prevent as much as possible the occurrence of the resonant vibration in the second torsion mode, in which the gain of the magnetic head slider 50 is difficult to be reduced by adjusting the position of the bended position of the load bending part 20.

In the magnetic head suspension in which the distance "a" is set from 0.78 L (=4.85 mm) to 1.13 L (=7 mm), the resonant frequency in the first torsion mode is not so high.

Accordingly, there is a possibility that the resonant vibration in the first torsion mode is generated in the magnetic head suspension in which the distance "a" is set from 0.78 L (=4.85 mm) to 1.13 L (=7 mm). However, the amount (gain) of the displacement of the magnetic head slider 50 from the target position due to the vibration in the first torsion mode can be easily reduced by adjusting the position of the bended position of the load bending part 20.

That is, in the magnetic head suspension in which the distance "a" is set from 0.78 L (=4.85 mm) to 1.13 L (=7 mm), it is not possible to prevent the resonant vibration in the first torsion mode from being generated, but it is possible to easily prevent or reduce the magnetic head slider 50 from being displaced even if the resonant vibration in the first torsion mode is generated.

Second Embodiment

Hereinafter, another embodiment of the magnetic head suspension according to the present invention will be described, with reference to the attached drawings.

FIG. 6 is a top view of a magnetic head suspension 2 according to the present embodiment.

Figures 6A, 6B:
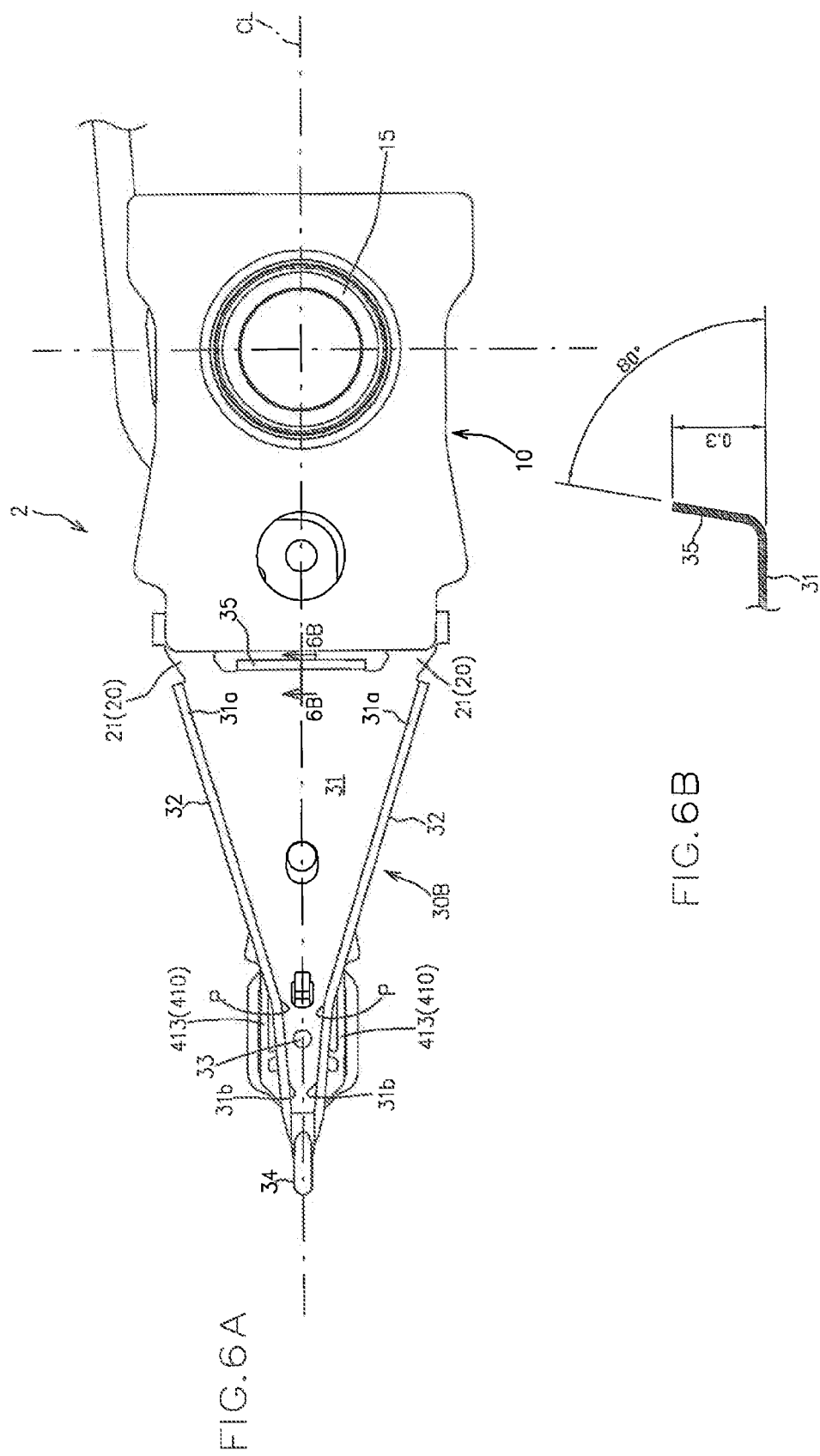
FIG. 6A is a top view of a magnetic head suspension according to a second embodiment of the present invention.
FIG. 6B is a cross sectional view taken along line 6B-6B in FIG. 6A.

FIG. 6B is a cross sectional view taken along line 6B-6B in FIG. 6A.

In the figures, the members same as those in the first embodiment are denoted by the same reference numerals to omit the detailed description thereof.

As shown in FIGS. 6A and 6B, the magnetic head suspension 2 according to the present embodiment is different from the magnetic head suspension 1 according to the first embodiment in that the main body portion 31 of a load beam part 30B is provided at the proximal edge with a proximal flange portion 35.

More specifically, the magnetic head suspension 2 according to the present embodiment includes the load beam part 30B in place of the load beam part 30 in comparison with the magnetic head suspension 1 according to the first embodiment.

The load beam part 30B includes the main body portion 31 and the paired flange portions 32, and also includes the proximal flange portion 35 that extends in the direction opposite from the disk surface from the proximal edge of the main body portion 31.

The resonant frequencies in the first torsion mode were obtained in accordance with the finite element method on magnetic head suspensions 2d to 2e in which the distances "a", each in the suspension longitudinal direction between the distal edge of the supporting part 10 and each of the inflection points P, were set to 0.78 L (=4.85 mm), 0.91 L (=5.65 mm) and 1.05 L (=6.49 mm), respectively in a state where the proximal flange portion 35 was configured so that a length in the suspension width direction was set to 2.0 mm, an inclination angle with respect to the main body portion 31 was set to 80°, and a height in the z direction was set to 0.3 mm.

FIG. 4 also shows the result.

As being apparently seen from FIG. 4, the provision of the proximal flange portion 35 at the proximal edge of the main body portion 31 can raise the resonant frequency in the first torsion mode, thereby preventing the resonant vibration in the first torsion mode.

Third Embodiment

Hereinafter, still another embodiment of the magnetic head suspension according to the present invention will be described, with reference to the attached drawings.

Figures 7A, 7B:
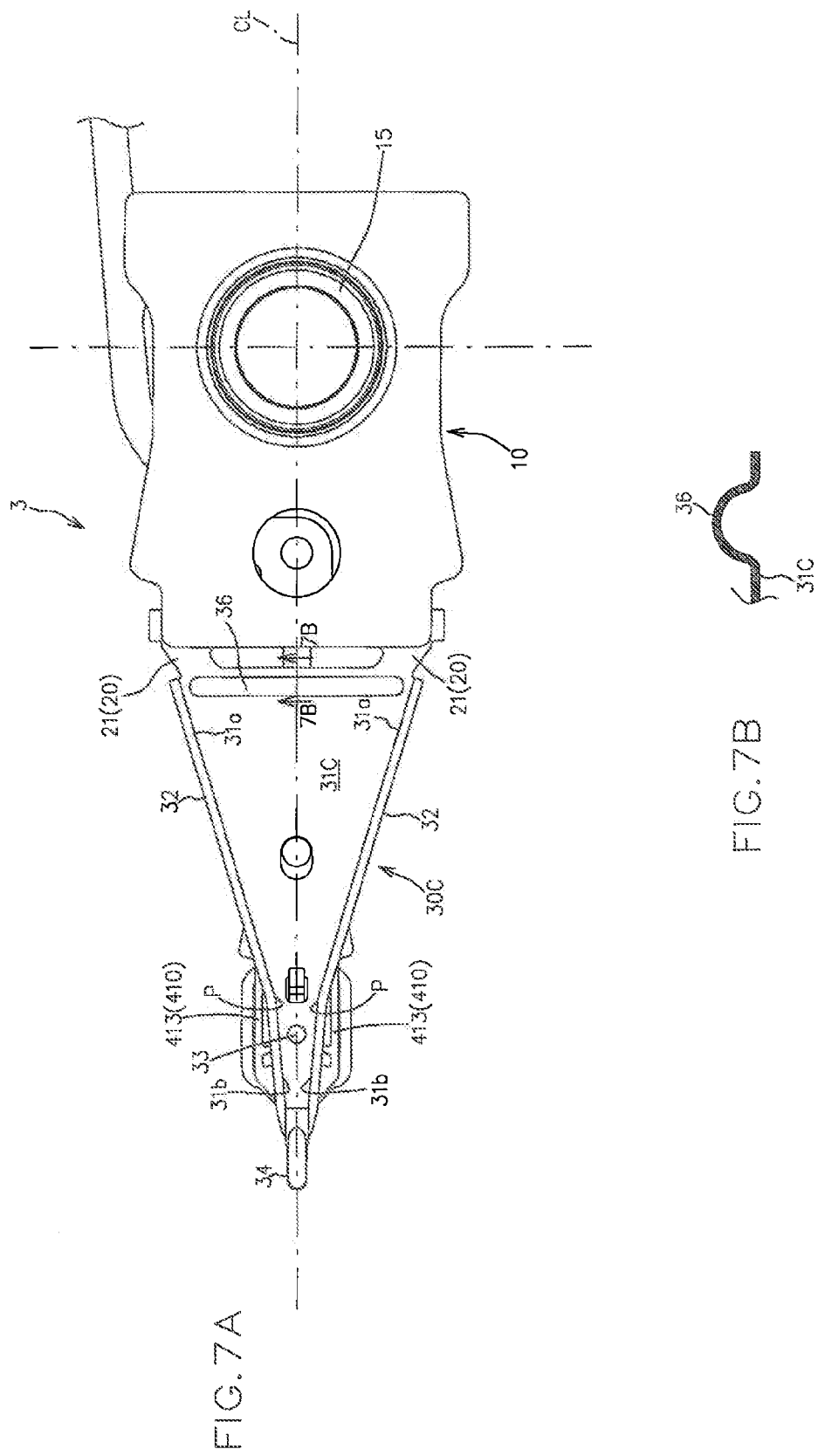
FIG. 7A is a top view of a magnetic head suspension according to a third embodiment of the present invention.
FIG. 7B is a cross sectional view taken along line 7B-7B in FIG. 7A.

FIG. 7A is a top view of a magnetic head suspension 3 according to the present embodiment.

FIG. 7B is a cross sectional view taken along line 7B-7B in FIG. 7A.

In the figures, the members same as those in the first and second embodiments are denoted by the same reference numerals to omit the detailed description thereof.

As shown in FIGS. 7A and 7B, the magnetic head suspension 3 according to the present embodiment is different from the magnetic head suspension 1 according to the first embodiment in that a main body portion 31C of a load beam part 30 C is provided on a proximal side with a convex portion (or bulging portion) 36.

More specifically, the magnetic head suspension 3 according to the present embodiment includes the load beam part 30C in place of the load beam part 30 in comparison with the magnetic head suspension 1 according to the first embodiment.

The load beam part 30C includes a main body portion 31C substantially parallel to the disk surface, and the paired flange portions 32 that extend from both side edges of the main body portion 31C in the suspension width direction toward the direction opposite from the disk surface.

The main body portion 31C includes the convex portion 36 on the proximal side.

The convex portion 36 bulges toward the direction opposite from the disk surface and extends in the suspension width direction.

The provision of the convex portion 36 can raise the resonant frequency in the first torsion mode, thereby preventing resonant vibration in the first torsion mode.

Fourth Embodiment

Hereinafter, still another embodiment of the magnetic head suspension according to the present invention will be described, with reference to the attached drawings.

FIG. 8A is a top view of a magnetic head suspension 4 according to the present embodiment.

FIGS. 8B and 8C are cross sectional views taken along line 8B-8B and line 8C-8C in FIG. 8A, respectively.

In the figures, the members same as those in the first to third embodiments are denoted by the same reference numerals to omit the detailed description thereof.

As shown in FIGS. 8A to 8C, the magnetic head suspension 4 according to the present embodiment is different from the magnetic head suspension 1 according to the first embodiment in that it includes a damper 60 fixed to the upper surface, which is opposite from the disk surface, of the main body portion 31 of the load beam part 30.

The damper 60 may include a first layer 61 fixed to the upper surface of the main body portion 31 that is opposite from the disk surface and made from a viscoelastic material, and a second layer 62 fixed to an upper surface of the first layer 61 that is opposite from the disk surface.

The first layer 61 may be preferably formed by, for example, acrylic polymer and silicon.

The second layer 62 may be preferably formed by, for example, metal material such as stainless and aluminum, or plastic material such as polyethylene terephthalate.

Forming the second layer 62 with plastic material can improve impact resistance of the magnetic head suspension 4 thanks to reduction in mass, in comparison with a case of forming the second layer 62 with metal material.

The resonant frequencies in the first torsion mode were obtained on a plurality of magnetic head suspensions 4d to 4f in accordance with the finite element method. In each of the magnetic head suspensions 4d to 4f, the damper 60 has the first layer 61 made of an acrylic polymer of 50 µm in thickness and the second layer 62 made of a stainless steel of 50 µm in thickness, and is sized to cover substantially the entire area of the upper surface of the main body portion 31 that does not face the disk surface, the area extending from the proximal edge of the main body portion 31 until a position away from the proximal edge toward the distal end in the suspension longitudinal direction by 0.40 L (=2.45 mm). In the magnetic head suspensions 4d to 4f, the distances "a", each in the suspension longitudinal direction between the distal edge of the support portion 10 and each of the inflection points P, were set to 0.78 L (=485 mm), 0.91 L (=5.65 mm), and 1.05 L (=6.49 mm), respectively.

FIG. 4 also shows the result.

As is apparently seen from FIG. 4, the provision of the damper 60 on the upper surface of the main body portion 31 that is opposite from the disk surface can raise the resonant frequency in the first torsion mode, thereby preventing the resonant vibration in the first torsion mode.

Described below are a third analysis on the relationship between a fixed position of the damper 60 and the resonant frequency in the first torsion mode and a fourth analysis on the relationship between the fixed position and the resonant frequency in the SWAY mode, for a magnetic head suspension in which the distance "a" in the suspension longitudinal direction between the distal edge of the supporting part 10 and the inflection point P was set to 0.91 L (=5.65 mm).

The SWAY mode is a main resonant mode of the magnetic head suspension that mainly includes a vibration in the seek direction.

Figure 9A:
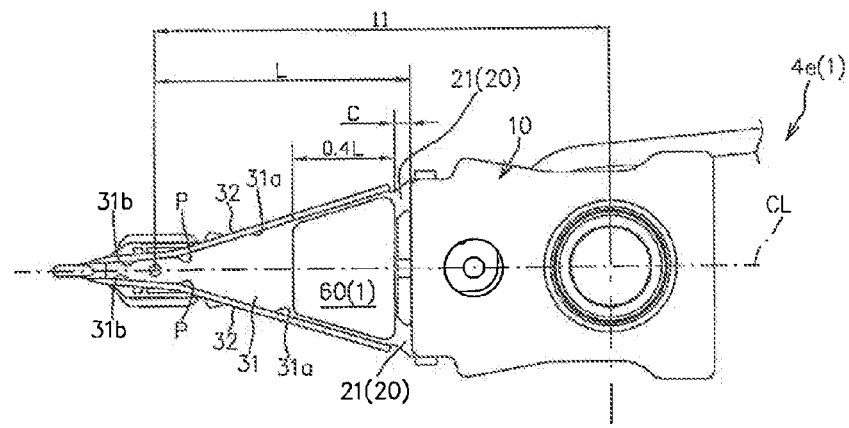
FIGS. 9A to 9C are top views of magnetic head suspensions used for third and fourth analyses, respectively.
Figure 9B:
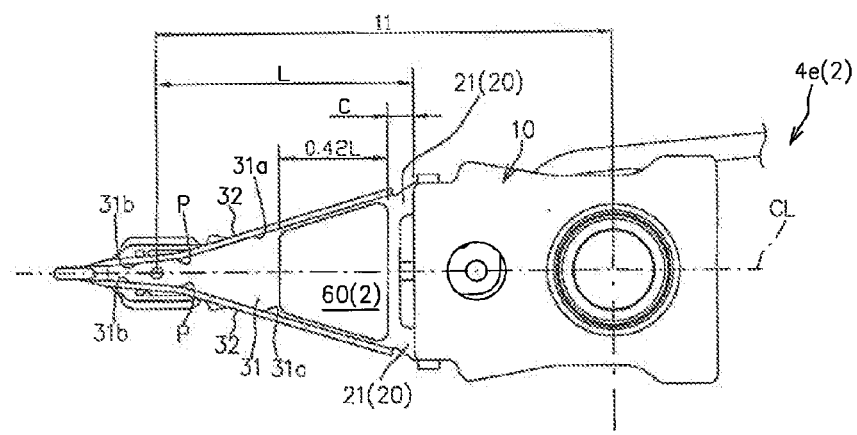
Figure 9C:
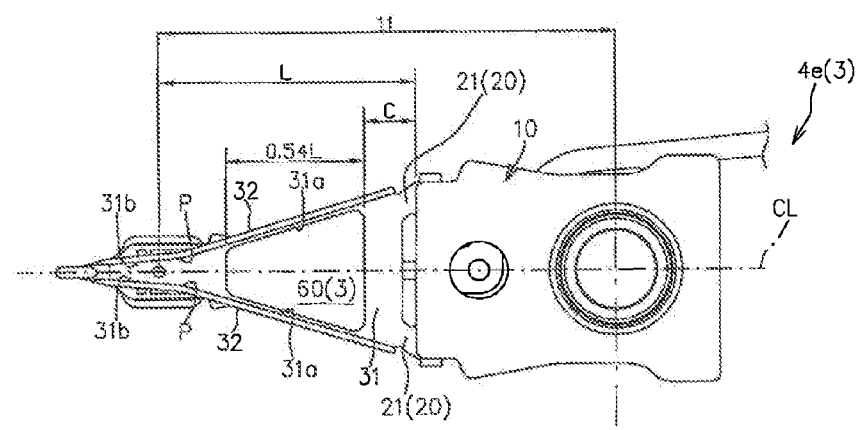

FIGS. 9A to 9C are top views of magnetic head suspensions 4e(1) to 4e(3) used for the third and fourth analyses.

The magnetic head suspension 4e(1) includes a damper 60(1) that covers the substantially entire region of the upper surface of the main body portion 31 that is opposite from the disk surface to extend from the proximal edge of the main body portion 31 until a position away from the proximal edge by 0.4 L (=2.45 mm) toward the distal side in the suspension longitudinal direction.

More specifically, the damper 60(1) of the magnetic head suspension 4c(1) has the proximal end portion arranged so that a distance "C" in the suspension longitudinal direction between the proximal end portion thereof and the distal edge of the supporting part 10 is 0.065 L (=0.4 mm), and also has a length of 0.4 L (=2.45 mm) in the suspension longitudinal direction.

The magnetic head suspension 4e(2) includes a damper 60(2) that is arranged forward from the damper 60(1) with respect to the suspension longitudinal direction and has an area (7.04 mm$^2$) identical with that of the damper 60(1).

More specifically, the damper 60(2) has a proximal end positioned such that the distance "C" is set to 0.1 L (=0.62 mm) in the suspension longitudinal direction between the proximal end thereof and the distal edge of the supporting part 10. Further, the damper 60(2) has the length in the suspension longitudinal direction set to 0.42 L (=2.60 mm) so as to have an area identical with that of the damper 60(1).

The magnetic head suspension 4e(3) includes a damper 60(3) that is arranged forward from the damper 60(2) with respect to the suspension longitudinal direction and has an area (6.5 mm$^2$) identical with those of the dampers 60(1), 60(2).

More specifically, the damper 60(3) has the proximal end portion arranged so that the distance "C" in the suspension longitudinal direction between the proximal end portion thereof and the distal edge of the supporting part 10 is 0.2 L (=1.24 mm), and also has a length in the suspension longitudinal direction of 0.54 L (=3.35 mm) so as to have an area identical with those of the dampers 60(1), 60(2).

Figure 10:
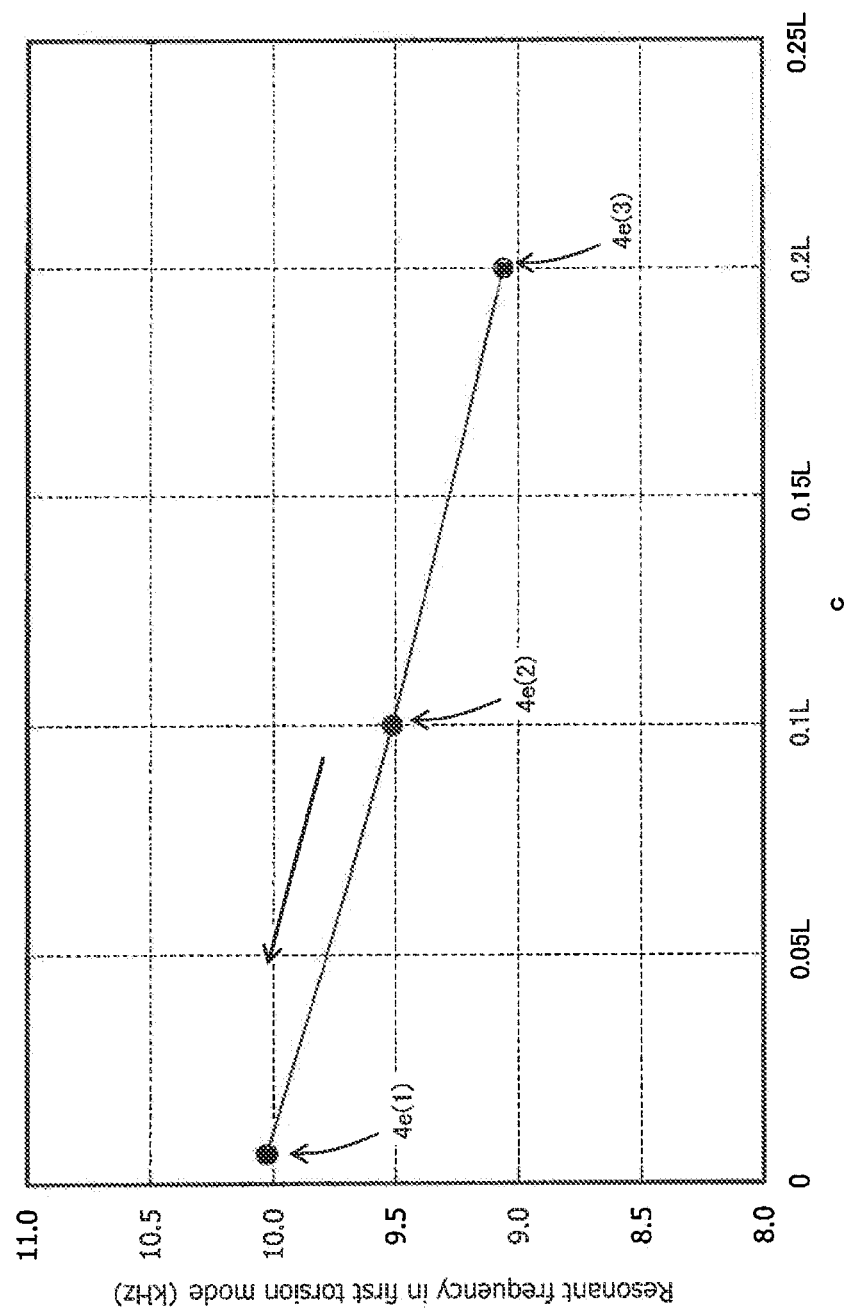
FIG. 10 is a graph showing a result of the third analysis.

As the third analysis, the relationship between the fixed position of the damper 60 (namely, the distance "C") and the resonant frequency in the first torsion mode was obtained in accordance with the finite element method, on each of the magnetic head suspensions 4e(1) to 4e(3). FIG. 10 shows a result of the third analysis.

Figure 11:
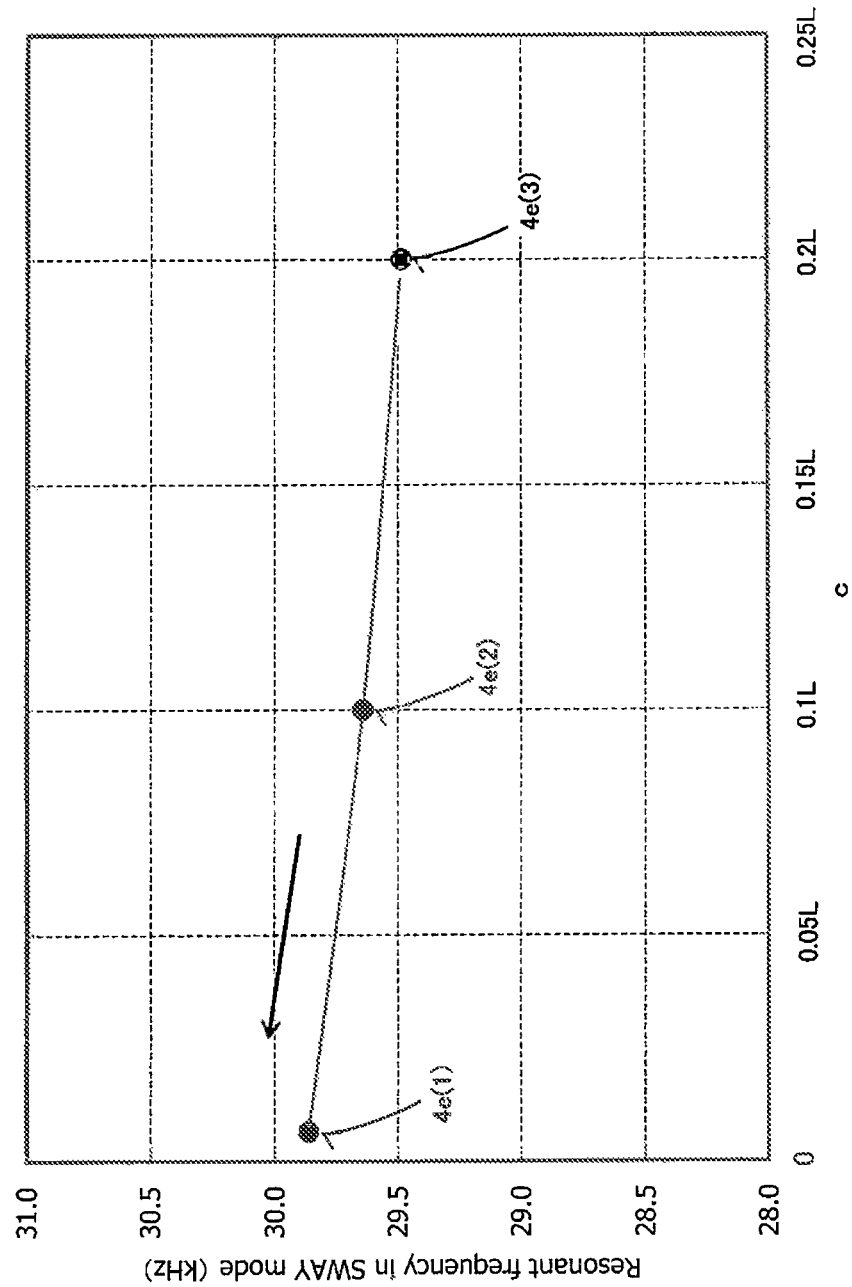
FIG. 11 is a graph showing a result of the fourth analysis.
Figure 12A:
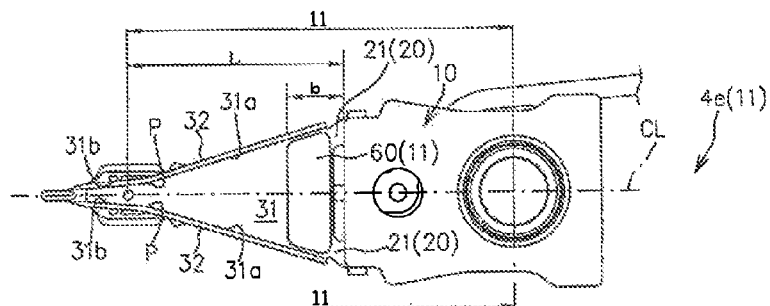
FIGS. 12A to 12E are top views of magnetic head suspensions used for fifth and sixth analyses.
Figure 12B:
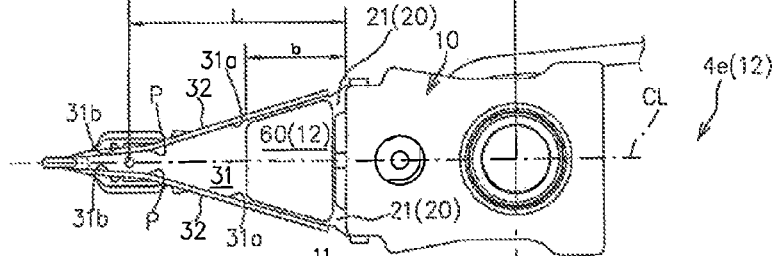
Figure 12C:
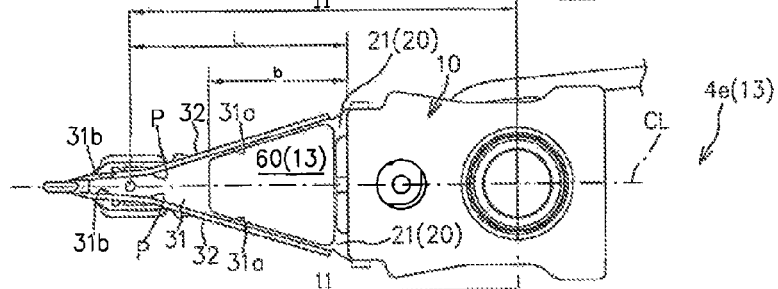
Figure 12D:
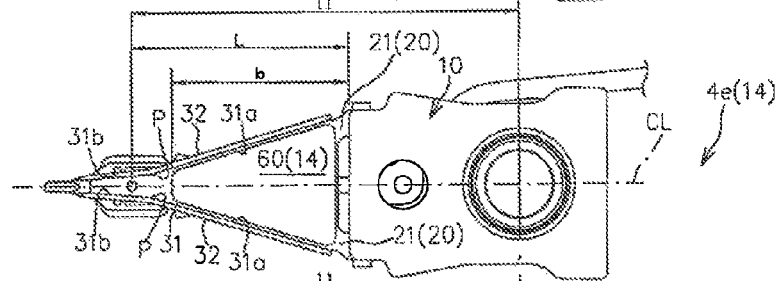
Figure 12E:
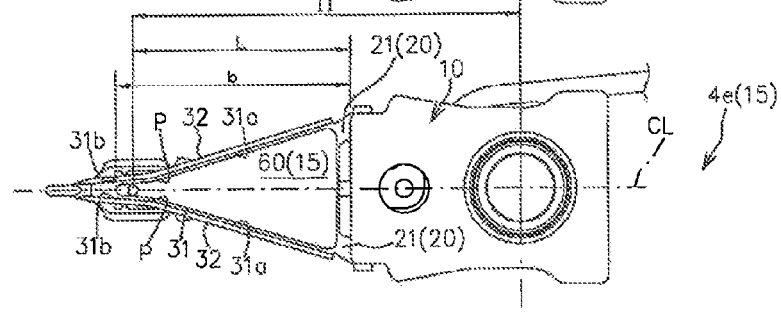

As the fourth analysis, the relationship between the fixed position of the damper 60 (namely, the distance "C") and the resonant frequency in the SWAY mode was obtained in accordance with the finite element method, on each of the magnetic head suspensions 4e(1) to 4e(3). FIG. 11 shows a result of the fourth analysis.

It is recognized from FIGS. 10 and 11 that, in cases of using the dampers 60 having identical areas, the resonant frequencies in the first torsion mode as well as in the SWAY mode can be raised by locating each of the dampers 60 as close as possible to the proximal end of the main body portion 31.

Described next are a fifth analysis conducted for obtaining the relationship between the length of the damper 60 in the suspension longitudinal direction and the resonant frequency in the first torsion mode, and a sixth analysis conducted for obtaining the relationship between the length and the resonant frequency in the SWAY mode.

FIGS. 12A to 12E are top views of magnetic head suspensions 4e(11) to 4e(15) that are used for the fifth and sixth analyses.

The magnetic head suspension 4e(11) includes a damper 60(11) configured so that a distance "b" in the suspension longitudinal direction between the distal edge of the supporting part 10 and the distal end of the damper is 0.26 L (=1.62 mm).

The magnetic head suspension 4e(12) includes a damper 60(12) configured so that the distance "b" in the suspension longitudinal direction between the distal edge of the supporting part 10 and the distal end of the damper is 0.46 L (=2.85 mm).

The magnetic head suspension 4e(13) includes a damper 60(13) configured so that the distance "b" in the suspension longitudinal direction between the distal edge of the supporting part 10 and the distal end of the damper is 0.64 L (=3.95 mm).

The magnetic head suspension 4e(14) includes a damper 60(14) configured so that the distance "b" in the suspension longitudinal direction between the distal edge of the supporting part 10 and the distal end of the damper is 0.81 L (=5.05 mm).

The magnetic head suspension 4e(15) includes a damper 60(15) configured so that the distance "b" in the suspension longitudinal direction between the distal edge of the supporting part 10 and the distal end of the damper is 1.08 L (=6.70 mm).

Figure 13:
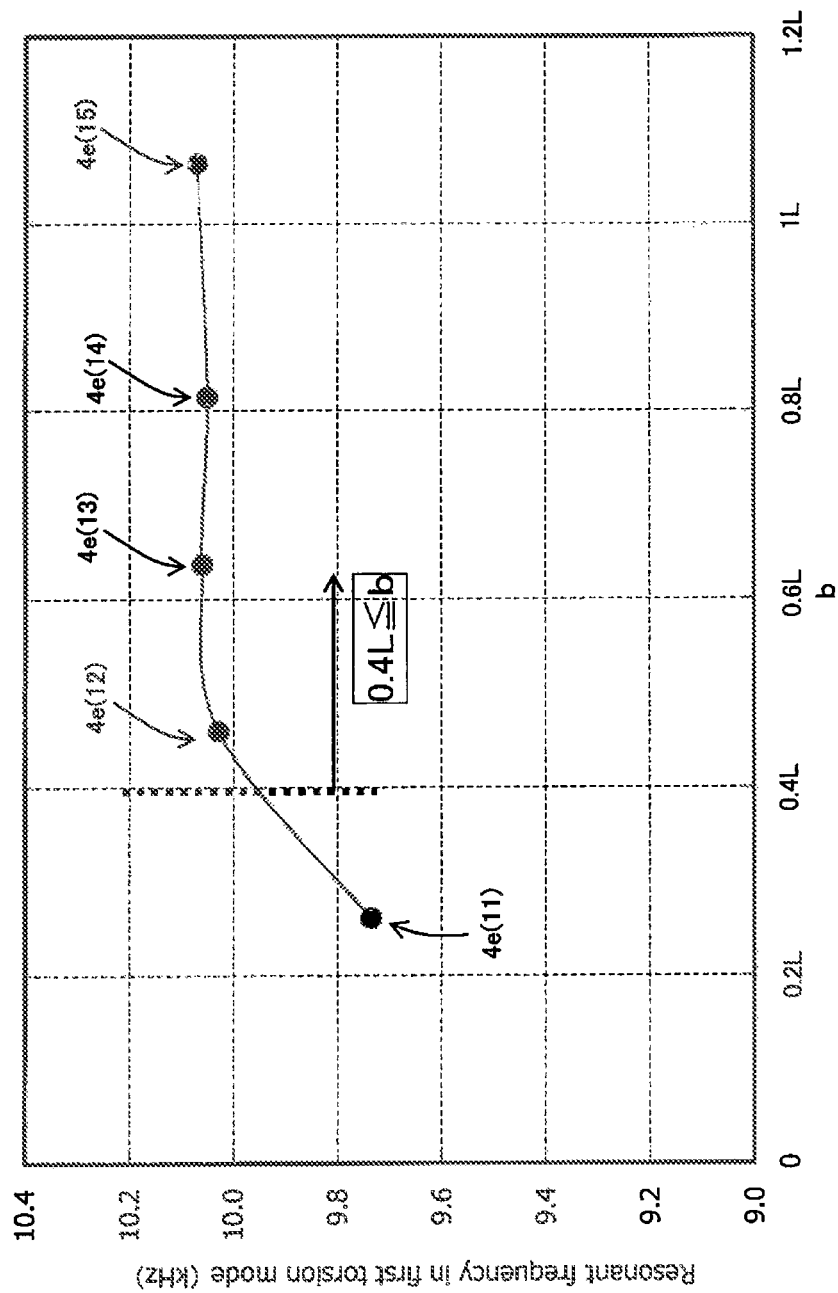
FIG. 13 is a graph showing a result of the fifth analysis.

As the fifth analysis, the resonant frequency in the first torsion mode was obtained on each of the magnetic head suspensions 4e(11) to 4e(15) in accordance with the finite element method. FIG. 13 shows a result of the fifth analysis.

Figure 14:
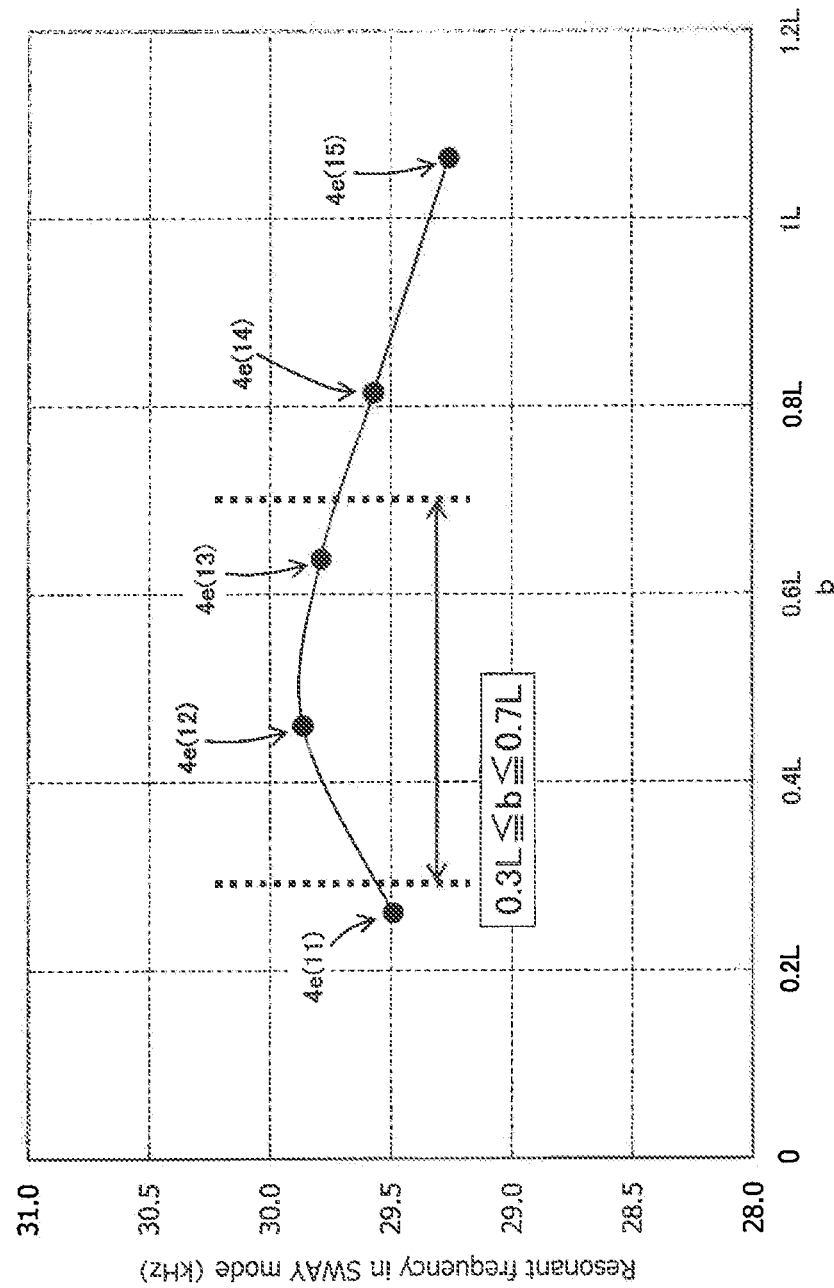
FIG. 14 is a graph showing a result of the sixth analysis.

As the sixth analysis, the resonant frequency in the SWAY mode was obtained on each of the magnetic head suspensions 4e(11) to 4e(15) in accordance with the finite element method. FIG. 14 shows a result of the sixth analysis.

As can be recognized from FIG. 13, the length "b" being set to 0.4 L or more enables the resonant frequency in the first torsion mode to be substantially in a best condition, and the resonant frequency in the first torsion mode is not raised any more even if the length "b" is set to be larger than 0.4 L.

Further, as can be recognized from FIG. 14, the length "b" satisfying the condition of $0.3\ L \leq b \leq 0.7\ L$ can raise the resonant frequency in the SWAY mode.

In accordance with the above analyses, the damper 60 is preferably located as close as possible to the proximal end of the main body portion 31 such that the proximal end of the damper 60 is located at a position substantially identical with the position of the proximal edge of the main body portion 31. Further, in order to raise the resonant frequencies both in the first torsion mode and the SWAY mode, the length of the damper 60 is preferably set such that the length "b" in the suspension longitudinal direction between the distal end thereof and the distal edge of the supporting part 10 satisfies the condition of $0.4\ L \leq b \leq 0.7\ L$.

Fifth Embodiment

Hereinafter, still another embodiment of the magnetic head suspension according to the present invention will be described, with reference to the attached drawings.

FIG. 15A is a top view of a magnetic head suspension 5 according to the present embodiment.

FIGS. 15B and 15C are cross sectional views taken along line 15B-15B and line 15C-15C in FIG. 15A, respectively.

In the figures, the members same as those in the first to fourth embodiments are denoted by the same reference numerals to omit the detailed description thereof.

As shown in FIGS. 15A to 15C, the magnetic head suspension 5 according to the present embodiment is different from the magnetic head suspension 1 according to the first embodiment in that a main body portion 31E of a load beam part 30E includes a thick region 37.

More specifically, the magnetic head suspension 5 according to the present embodiment includes the load beam part 30E in place of the load beam part 30, in comparison with the magnetic head suspension 1 according to the first embodiment.

The load beam part 30E includes the plate-like main body portion 31E that has a plate surface substantially parallel to the disk surface in a state where its proximal end is connected to the load bending part 20, and the paired flange portions 32 that extend from both side edges of the main body portion 31E in the suspension width direction toward the direction opposite from the disk surface.

The load beam part 30E further includes the lift tab 34 as in each of the embodiments explained earlier.

As shown in FIGS. 15B and 15C, the thick region 37 is formed by causing a part of the upper surface of the main body portion 31E that is opposite from the disk surface to bulge in the direction opposite from the disk surface.

The load beam part 30E provided with the thick region 37 can be easily manufactured by a method including the steps of: preparing a load beam part formation plate having a thickness at least equal to that of the thick region 37; and etching the load beam part formation plate from the upper surface not facing the disk surface, by a corresponding etching amount such that the thick region 37 and the remaining region have predetermined thicknesses, respectively.

The resonant frequency in the first torsion mode was obtained in accordance with the finite element method on each of magnetic head suspensions 5d to 5f configured as detailed below. Specifically, in each of these magnetic head suspensions 5d to 5f, the position of the thick region 37 in the suspension longitudinal direction is set such that the proximal end of the thick region 37 is located at a position substantially identical with that of the proximal end of the main body portion 31E and the distal end thereof is spaced apart in the suspension longitudinal direction from the distal edge of the supporting part 10 by 0.46 L (=2.85 mm). The main body portion 31E is 0.03 mm in thickness in the area except the thick region 37, and the thick region 37 is 0.08 mm in thickness. In the magnetic head suspensions 5d to 5f, the distances "a", each between the distal edge of the supporting part 10 and each of the inflection points P in the suspension longitudinal direction, were set to 0.78 L (=4.85 mm), 0.91 L (=5.65 mm), and 1.05 L (=6.49 mm), respectively.

The results are also shown in FIG. 4.

As being apparently seen from FIG. 4, the provision of the thick region 37 to the main body portion 31E can raise the resonant frequency in the first torsion mode, thereby preventing the resonant vibration in the first torsion mode from being generated.

Judging from the commonality between the thick region 37 and the damper 60, both of which are provided as reinforcing structures, the thick region 37 is preferably formed such that the proximal end thereof is located at a position substantially identical with that of the proximal edge of the main body portion 31E. Further, the thick region 37 is preferably formed such that the distance "b" in the suspension longitudinal direction between the distal end thereof and the distal edge of the supporting part 10 is more than or equal to 0.4 L and less than or equal to 0.7 L.

What is claimed is:

1. A magnetic head suspension comprising a supporting part that is swung in a seek direction parallel to a disk surface directly or indirectly by an actuator, a load bending part that is connected at a proximal end portion to a distal end portion of the supporting part so as to generate a load for pressing a magnetic head slider toward the disk surface, a load beam part that is connected at a proximal end portion to a distal end portion of the load bending part and transmits the load to the magnetic head slider, and a flexure part that is supported by the load beam part and the supporting part, wherein the load beam part includes a plate-like main body portion and paired right and left flange portions, the main body portion having a proximal end portion that is connected to the load bending part and a lower surface that faces the disk surface and to which a flexure substrate of the flexure part is fixed, the paired flange portions extending from both side edges of the main body portion in a suspension width direction toward a direction opposite from the disk surface, wherein each of the right and left side edges of the main body portion includes a proximal end region and a distal end region, the proximal end region being inclined to a suspension longitudinal center line at a first inclination angle so as to come closer to the center line as it advances from the proximal side to the distal side in the suspension longitudinal direction, the distal end region being inclined to the center line at a second inclination angle, which is smaller than the first inclination angle, so as to come closer to the center line as it advances from the proximal side, which is connected to the distal portion of the proximal end region with an inflection point being interposed between them, to the distal side in the suspension longitudinal direction, and wherein, in, a case where a distance in the suspension longitudinal direction between the distal end portion of the supporting part and a dimple provided in the load beam part is represented by "L", a distance "a" in the suspension longitudinal direction between the distal end portion of the supporting part and the inflection point is set so as to satisfy a condition of $0.78\,L \leqq a \leqq 1.13\,L$ such that a resonant frequency of the magnetic head suspension in a second torsion mode is increased.

2. A magnetic head suspension according to claim 1, wherein the load beam part is provided at the proximal edge of the main body portion with a proximal flange portion that extends toward the direction opposite from the disk surface.

3. A magnetic head suspension according to claim 1, wherein the main body portion of the load beam part is provided with a convex portion that bulges toward the direction opposite from the disk surface.

4. A magnetic head suspension according to claim 1, further comprising a damper fixed to the upper surface, which is opposite from the disk surface, of the main body portion of the load beam part.

5. A magnetic head suspension according to claim 1, wherein the main body portion of the load beam part includes a thick region that is thickened toward the direction opposite from the disk surface.

6. A magnetic head suspension according to claim 4, wherein the damper is arranged so that a proximal end portion of the damper is located at a position substantially identical with a position of the proximal edge of the main body portion, and a distance "b" in the suspension longitudinal direction between a distal end portion of the damper and the distal end portion of the supporting part satisfies a condition of $0.4\,L \leqq b \leqq 0.7\,L$.

7. A magnetic head suspension according to claim 5, wherein the thick region is arranged so that a proximal end portion of the thick region is located at a position substantially identical with a position of the proximal edge of the main body portion, and a distance "b" in the suspension longitudinal direction between a distal end portion of the thick legion and the distal end portion of the supporting part satisfies a condition of $0.4\,L \leqq b \leqq 0.7\,L$.

8. A magnetic head suspension according to claim 1, wherein a=L, such that the inflection point is arranged at the same position as the dimple with respect to the suspension longitudinal direction.

* * * * *